US009083893B2

(12) United States Patent
Nagashima (10) Patent No.: US 9,083,893 B2
(45) Date of Patent: Jul. 14, 2015

(54) PROJECTOR CAPABLE OF SUPPRESSING DETERIORATION OF IRRADIATED PROJECTION WHILE IMPROVING BRIGHTNESS

(75) Inventor: Kenji Nagashima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 210 days.

(21) Appl. No.: 13/809,717

(22) PCT Filed: Jul. 7, 2011

(86) PCT No.: PCT/JP2011/065548
§ 371 (c)(1),
(2), (4) Date: Feb. 5, 2013

(87) PCT Pub. No.: WO2012/008350
PCT Pub. Date: Jan. 19, 2012

(65) Prior Publication Data
US 2013/0155336 A1    Jun. 20, 2013

(30) Foreign Application Priority Data
Jul. 12, 2010   (JP) ................................. 2010-158096

(51) Int. Cl.
*G03B 21/00* (2006.01)
*H04N 9/31* (2006.01)
(Continued)

(52) U.S. Cl.
CPC ............ *H04N 9/3129* (2013.01); *G02B 26/101* (2013.01); *G02B 27/22* (2013.01); *G02B 27/26* (2013.01); *G02F 1/1313* (2013.01);
(Continued)

(58) Field of Classification Search
CPC .......... H04N 13/0422; H04N 13/0431; H04N 13/0434; H04N 13/0459
USPC ............... 353/7–8, 30–34, 81, 94, 85, 98–99; 359/5, 7–9, 57, 61, 96, 201, 202; 349/5, 7–9, 57, 61, 96, 201, 202
See application file for complete search history.

(56) References Cited

U.S. PATENT DOCUMENTS

2007/0132953 A1* 6/2007 Silverstein ........................ 353/7
2009/0122271 A1   5/2009 Nagashima et al.
(Continued)

FOREIGN PATENT DOCUMENTS

JP   2009134135 A   5/1997
JP   2003172900 A   6/2003
(Continued)

OTHER PUBLICATIONS

Extended European search report, from European patent application 11806680.2, dated Nov. 27, 2013, 14 pgs., mailed from the European Patent Office, Munich, Germany.
(Continued)

*Primary Examiner* — Sultan Chowdhury
(74) *Attorney, Agent, or Firm* — Baker & Hostetler LLP (57) ABSTRACT

Provided is a projector capable of suppressing deterioration of a portion of a projection portion irradiated with a laser beam while improving brightness. This projector is formed to deviate optical axes of laser beams emitted from a plurality of laser beam generation portions respectively from each other so that the laser beams emitted from the plurality of laser beam generation portions respectively do not concentrate on one point of a projection portion.

19 Claims, 5 Drawing Sheets

(51) Int. Cl.
*H04N 13/04* (2006.01)
*G02B 26/10* (2006.01)
*G02B 27/26* (2006.01)
*G03B 21/14* (2006.01)
*G03B 21/28* (2006.01)
*G02B 27/22* (2006.01)
*G02F 1/13* (2006.01)

(52) U.S. Cl.
CPC ............... *G03B 21/14* (2013.01); *G03B 21/28* (2013.01); *H04N 13/0422* (2013.01); *H04N 13/0427* (2013.01); *H04N 13/0431* (2013.01); *H04N 13/0434* (2013.01); *H04N 13/0459* (2013.01)

(56) References Cited

U.S. PATENT DOCUMENTS

| | | | |
|---|---|---|---|
| 2009/0161074 A1* | 6/2009 | Shinozaki et al. | 353/30 |
| 2009/0231697 A1 | 9/2009 | Marcus et al. | |
| 2010/0014054 A1 | 1/2010 | Lapchuk et al. | |
| 2010/0149073 A1* | 6/2010 | Chaum et al. | 345/8 |
| 2010/0253769 A1* | 10/2010 | Coppeta et al. | 348/58 |

FOREIGN PATENT DOCUMENTS

| | | |
|---|---|---|
| JP | 2005077715 A | 3/2005 |
| JP | 2007047245 A | 2/2007 |
| JP | 2007156057 A | 6/2007 |
| JP | 2009122366 A | 6/2009 |
| JP | 2009114055 A1 | 9/2009 |
| JP | 2010026483 A | 2/2010 |
| WO | 2009114055 A1 | 9/2009 |
| WO | 2012008350 A1 | 1/2012 |

OTHER PUBLICATIONS

International Search Report and Written Opinion, from PCT/JP2011/065548 with an international filing date of Jul. 7, 2011, mailed by the Japanese Patent Office on Aug. 16, 2011.

* cited by examiner

PROJECTOR CAPABLE OF SUPPRESSING DETERIORATION OF IRRADIATED PROJECTION WHILE IMPROVING BRIGHTNESS

CROSS-REFERENCE TO RELATED APPLICATIONS

The present application is a national stage entry of PCT/JP2011/065548, filed Jul. 7, 2011, which claims the benefit of Japanese Application Serial No. 2010-158096, filed Jul. 12, 2010.

TECHNICAL FIELD

The present invention relates to a projector, and more particularly, it relates to a projector including a projection portion projecting an image onto an arbitrary projection area.

BACKGROUND TECHNIQUE

A projector including a projection portion projecting an image onto an arbitrary projection area is known in general. Such a projector is disclosed in Japanese Patent Laying-Open No. 9-134135, for example.

In the aforementioned Japanese Patent Laying-Open No. 9-134135, there is disclosed a laser projection display (projector) including a plurality of laser transmitters emitting red (R), green (G) and blue (B) laser beams respectively and a polygonal rotating mirror (projection portion) for horizontally scanning the emitted laser beams. This laser projection display is provided with a plurality of sets of laser transmitters each emitting red (R), green (G) and blue (B) laser beams, in order to improve brightness of laser beams (image) projected on a screen. The laser projection display is so formed that the laser beams emitted from the plurality of sets of laser transmitters respectively are applied concentrically to the same point of the polygonal rotating mirror through a laser beam splitter, a modulator, a photosynthetic optical system and a reflecting mirror etc. Further, the laser projection display is so formed that the laser beams applied to the polygonal rotating mirror are reflected on the surface of the polygonal rotating mirror and thereafter projected onto the screen through a rotating reflection optical system for vertically scanning the laser beams, a condenser lens and a taking lens.

PRIOR ART

Patent Document

Patent Document 1: Japanese Patent Laying-Open No. 9-134135

SUMMARY OF THE INVENTION

Problems to be Solved by the Invention

In the laser projection display according to the aforementioned Japanese Patent Laying-Open No. 9-134135, however, the laser beams emitted from the plurality of sets of laser transmitters respectively are concentrically applied to the same point of the polygonal rotating mirror in order to improve the brightness of the laser beams, and hence there is such a problem that a portion of the polygonal rotating mirror (projection area) irradiated with the laser beams is easy to deteriorate.

The present invention has been proposed in order to solve the aforementioned problem, and an object of the present invention is to provide a projector capable of inhibiting a portion of a projection portion irradiated with laser beams from deterioration while improving brightness.

Means for Solving the Problems and Effects of the Invention

A projector according to an aspect of the present invention includes a plurality of laser beam generation portions emitting laser beams having substantially identical lasing wavelengths and a projection portion projecting an image onto an arbitrary projection area by scanning the laser beams emitted from the plurality of laser beam generation portions respectively, and is formed to deviate optical axes of the laser beams emitted from the plurality of laser beam generation portions respectively from each other so that the laser beams emitted from the plurality of laser beam generation portions respectively do not concentrate on one point of the projection portion.

As hereinabove described, the projector according to this aspect is formed to deviate the optical axes of the laser beams emitted from the plurality of laser beam generation portions respectively from each other so that the laser beams emitted from the plurality of laser beam generation portions respectively do not concentrate on one point of the projection portion so that the laser beams are applied to the projection portion in a dispersed state, whereby a portion of the projection portion irradiated with the laser beams can be inhibited from deterioration while improving brightness, dissimilarly to a case where the laser beams are concentrically applied to the same point of the projection area. Further, energy of the laser beams can be inhibited from concentrating on the projection portion, whereby deterioration of the projection portion resulting from heat of the energy can be suppressed.

Preferably, the projector according to the aforementioned aspect further includes a control portion controlling generation timings of the laser beams emitted from the plurality of laser beam generation portions respectively, and the control portion is formed to deviate the timings when the plurality of laser beam generation portions emit the laser beams from each other in response to the quantities of deviation of the optical axes of the laser beams emitted from the plurality of laser beam generation portions respectively so that the image projected onto the arbitrary projection area substantially coincides when the image is projected by scanning the laser beams emitted from the plurality of laser beam generation portions whose optical axes have been deviated from each other. When forming the projector in this manner, the image projected onto the arbitrary area can be inhibited from deviation.

Preferably in this case, the control portion is formed to deviate the timings when the plurality of laser generation portions emit the laser beams from each other in response to the quantities of deviation of the optical axes of the laser beams emitted from the plurality of laser beam generation portions respectively so that the image projected onto the arbitrary projection area substantially coincides. When forming the projector in this manner, deviation of the image projected onto the arbitrary projection area resulting from the quantities of deviation of the optical axes of the laser beams emitted from the plurality of laser beam generation portions respectively can be easily suppressed.

Preferably in the projector according to the aforementioned aspect, the plurality of laser beam generation portions emitting the laser beams having substantially identical lasing wavelengths include a first laser beam generation portion for emitting a first laser beam and a second laser beam generation portion for emitting a second laser beam, and the projector is formed to synthesize the first laser beam and the second laser beam with each other while deviating the optical axes of the first laser beam and the second laser beam from each other so that the first laser beam and the second laser beam do not concentrate on one point of the projection portion. When forming the projector in this manner, the first laser beam and the second laser beam are applied to the projection portion in a dispersed state, whereby portions of the projection portion irradiated with the first laser beam and the second laser beam can be inhibited from deterioration dissimilarly to a case where the first laser beam and the second laser beam are concentrically applied to the same point of the projection portion.

Preferably in this case, the first laser beam generation portion is formed to emit the first laser beam having a first polarization direction, the second laser beam generation portion is formed to emit the second laser beam having a second polarization direction orthogonal to the first polarization direction, and the projector is formed to synthesize the first laser beam and the second laser beam with each other while deviating the optical axes of the first laser beam having the first polarization direction and the second laser beam having the second polarization direction from each other so that the first laser beam and the second laser beam do not concentrate on one point of the projection portion. When forming the projector in this manner, the first laser beam having the first polarization direction and the second laser beam having the second polarization direction are applied to the projection portion in a dispersed state, whereby the portions of the projection portion irradiated with the first laser beam and the second laser beam can be inhibited from deterioration dissimilarly to the a where the first laser beam having the first polarization direction and the second laser beam having the second polarization direction are concentrically applied to the same point of the projection portion.

Preferably, the aforementioned projector including the first and second laser beam generation portions further includes a plurality of optical members reflecting the first laser beam emitted from the first laser beam generation portion and the second laser beam emitted from the second laser beam generation portion or transmitting the first and second beams therethrough, and is formed to synthesize the first laser beam and the second laser beam with each other while deviating the optical axes of the first laser beam and the second laser beam from each other so that the first laser beam and the second laser beam do not concentrate on one point not only with respect to the projection portion but also with respect to the plurality of optical members. When forming the projector in this manner, the first laser beam and the second laser beam are applied not only to the projection portion but also to the plurality of optical members in the dispersed state, whereby the portions irradiated with the first laser beam and the second laser beam can be inhibited from deterioration not only with respect to the projection portion but also with respect to the plurality of optical members.

Preferably, the aforementioned projector including the first and second laser beam generation portions is so formed that the first laser beam and the second laser beam are applied through substantially identical paths in a state where the optical axes deviate from each other after being synthesized, not to concentrate on one point of the projection portion. When forming the projector in this manner, the structure of the projector can be simplified dissimilarly to a case where paths through which the first laser beam and the second laser beam are applied are separately provided.

Preferably, the aforementioned projector including the first and second laser beam generation portions is so formed that the first laser beam and the second laser beam are emitted not to concentrate on one point of the projection portion in a state where the optical axes substantially parallelly deviate from each other. When forming the projector in this manner, the optical axes of the first laser beam and the second laser beam can be easily inhibited from concentrating on the same point of the projection portion.

Preferably in the aforementioned projector including the first and second laser beam generation portions, the first laser beam generation portion includes a first red laser beam generation portion, a first green laser beam generation portion and a first blue laser beam generation portion, the second laser beam generation portion includes a second red laser beam generation portion, a second green laser beam generation portion and a second blue laser beam generation portion, the projector is so formed that optical axes of the first laser beams emitted from the first red laser beam generation portion, the first green laser beam generation portion and the first blue laser beam generation portion respectively overlap on the same axis, so formed that optical axes of the second laser beams emitted from the second red laser beam generation portion, the second green laser beam generation portion and the second blue laser beam generation portion respectively overlap on the same axis, and formed to deviate the optical axes of the first laser beams emitted from the first red laser beam generation portion, the first green laser beam generation portion and the first blue laser beam generation portion respectively to overlap on the same axis and the optical axes of the second laser beams emitted from the second red laser beam generation portion, the second green laser beam generation portion and the second blue laser beam generation portion respectively to overlap on the same axis from each other. When forming the projector in this manner, red (R), green (G) and blue (B) first laser beams emitted from the first red laser beam generation portion, the first green laser beam generation portion and the first blue laser beam generation portion respectively and red (R), green (G) and blue (B) second laser beams emitted from the second red laser beam generation portion, the second green laser beam generation portion and the second blue laser beam generation portion respectively are applied to the projection portion in a dispersed state, whereby portions of the projection portion irradiated with the first laser beams and the second laser beams can be inhibited from deterioration in a case of color-displaying the image in red (R), green (G) and blue (B).

Preferably, the aforementioned projector including the first laser beam generation portion for emitting the first laser beam having the first polarization direction and the second laser beam generation portion for emitting the second laser beam having the second polarization direction further includes a spatial modulator for rotating at least one of the first polarization direction of the first laser beam and the second polarization direction of the second laser beam by a prescribed angle. When forming the projector in this manner, the first laser beam and the second laser beam can be applied to the projection portion in the state rotating at least one of the first polarization direction of the first laser beam and the second polarization direction of the second laser beam by the prescribed angle.

Preferably in this case, the spatial modulator is formed to rotate at least one of the first polarization direction of the first laser beam and the second polarization direction of the second laser beam by 90 degrees. When forming the projector in this manner, the first laser beam and the second laser beam can be applied to the projection portion in the state rotating at least one of the first polarization direction of the first laser beam and the second polarization direction of the second laser beam by 90 degrees.

Preferably in the aforementioned projector including the spatial modulator rotating at least one of the first laser beam having the first polarization direction and the second laser beam having the second polarization direction by 90 degrees, the spatial modulator is formed to alternately repeat an operation of rotating both of the first polarization direction of the first laser beam and the second polarization direction of the second laser beam by 90 degrees and an operation of transmitting the first laser beam and the second laser beam therethrough as such without rotating both of the first polarization direction of the first laser beam and the second polarization direction of the second laser beam. When forming the projector in this manner, brightness difference per frame resulting from difference between transmittance values of the first laser beam having the first polarization direction and the second laser beam having the second polarization direction can be averaged, whereby occurrence of a flicker (blink) in the projected image can be suppressed.

Preferably in the aforementioned projector including the spatial modulator repeating the operation of rotating both of the first laser beam having the first polarization direction and the second laser beam having the second polarization direction and the operation of transmitting the first laser beam and the second laser beam therethrough as such without rotation, the spatial modulator includes a liquid crystal device, and the liquid crystal device is formed to alternately repeat the operation of rotating both of the first polarization direction of the first laser beam and the second polarization direction of the second laser beam by 90 degrees and the operation of transmitting the first laser beam and the second laser beam therethrough as such without rotating both of the first polarization direction of the first laser beam and the second polarization direction of the second laser beam by being switched to an ON-state and to an OFF-state. When forming the projector in this manner, the brightness difference per frame resulting from the difference between the transmittance values of the first laser beam having the first polarization direction and the second laser beam having the second polarization direction can be easily averaged by employing the liquid crystal device.

Preferably in the aforementioned projector including the first laser beam generation portion for emitting the first laser beam having the first polarization direction and the second laser beam generation portion for emitting the second laser beam having the second polarization direction, the first laser beam having the first polarization direction includes one of a laser beam of an S wave and a laser beam of a P wave orthogonal to the laser beam of the S wave, the second laser beam having the second polarization direction includes the other one of the laser beam of the S wave and the laser beam of the P wave orthogonal to the laser beam of the S wave, and the projector is formed to synthesize the laser beam of the S wave and the laser beam of the P wave with each other while deviating optical axes of the laser beam of the S wave and the laser beam of the P wave from each other so that the laser beam of the S wave and the laser beam of the P wave do not concentrate on one point of the projection portion. When forming the projector in this manner, the first laser beam including one of the laser beam of the S wave and the laser beam of the P wave and the second laser beam including the other one of the laser beam of the S wave and the laser beam of the P wave are applied to the projection portion in a dispersed state, whereby portions of the projection portion irradiated with the first laser beam including one of the laser beam of the S wave and the laser beam of the P wave and the second laser beam including the other one of the laser beam of the S wave and the laser beam of the P wave can be inhibited from deterioration.

Preferably in the aforementioned projector including the first laser beam generation portion for emitting the first laser beam having the first polarization direction and the second laser beam generation portion for emitting the second laser beam having the second polarization direction, the projection portion is formed to be capable of projecting a stereoscopic image onto the arbitrary projection area by scanning the first laser beam and the second laser beam, and formed to project a stereoscopic image for a right eye by scanning one of the first laser beam and the second laser beam and to project a stereoscopic image for a left eye by scanning the other one of the first laser beam and the second laser beam. When forming the projector in this manner, the stereoscopic image for the right eye and the stereoscopic image for the left eye can be simultaneously projected in one frame, whereby a frame rate may not be raised dissimilarly to a case of alternately projecting the stereoscopic image for the right eye and the stereoscopic image for the left eye every frame, for example.

Preferably in this case, the projector is so formed that a laser beam projecting the stereoscopic image for the right eye by scanning one of the first laser beam and the second laser beam and a laser beam projecting the stereoscopic image for the left eye by scanning the other one of the first laser beam and the second laser beam project the stereoscopic images in a state where optical axes deviate from each other. When forming the projector in this manner, the stereoscopic images can be projected while inhibiting the laser beam projecting the stereoscopic image for the right eye and the laser beam projecting the stereoscopic image for the left from being concentrically applied onto the same point of the projection portion.

Preferably, the aforementioned projector formed to project the stereoscopic images in the state where the optical axes deviate from each other is so formed that the laser beam projecting the stereoscopic image for the right eye and the laser beam projecting the stereoscopic image for the left eye project the stereoscopic images by being simultaneously emitted in the state where the optical axes deviate from each other. When forming the projector in this manner, the stereoscopic images can be projected without raising the frame rate dissimilarly to the case of alternately projecting the stereoscopic image for the right eye and the stereoscopic image for the left eye every frame.

Preferably in the projector according to the aforementioned aspect, the projection portion includes a vibrating mirror projecting the image by scanning the arbitrary projection area in a vertical direction and a transverse direction, and the projector is formed to deviate optical axes of the laser beams emitted from the plurality of laser beam generation portions respectively from each other so that the laser beams emitted from the plurality of laser beam generation portions respectively do not concentrate on one point of the vibrating mirror. When forming the projector in this manner, the first laser beam and the second laser beam are applied to the vibrating mirror in a dispersed state, whereby portions of the vibrating mirror irradiated with the first laser beam and the second laser beam can be inhibited from deterioration, dissimilarly to a case where the first laser beam and the second laser beam are concentrically applied to the same point of the vibrating mirror.

Preferably, the projector according to the aforementioned aspect further includes a sensing portion sensing that a projection screen projected by the projection portion in the state where the optical axes of the laser beams emitted from the plurality of laser beam generation portions respectively deviate from each other has been operated by the user. When forming the projector in this manner, it is possible to easily sense that the projection screen has been operated by the user.

Preferably, the projector according to the aforementioned aspect further includes a splitter member projecting a projection screen projected by the projection portion in the state where the optical axes of the laser beams emitted from the plurality of laser beam generation portions respectively deviate from each other on a plurality of projection areas. When forming the projector in this manner, the user can use a projected image projected on one projection area included in the plurality of projection areas for operation and can use a projected image projected on another projection area included in the plurality of projection areas for presentation (for display), for example.

MODES FOR CARRYING OUT THE INVENTION

Embodiments embodying the present invention are now described on the basis of the drawings.

(First Embodiment)

The structure of a projector 100 according to a first embodiment of the present invention is described with reference to FIGS. 1 to 5.

Figure 1:
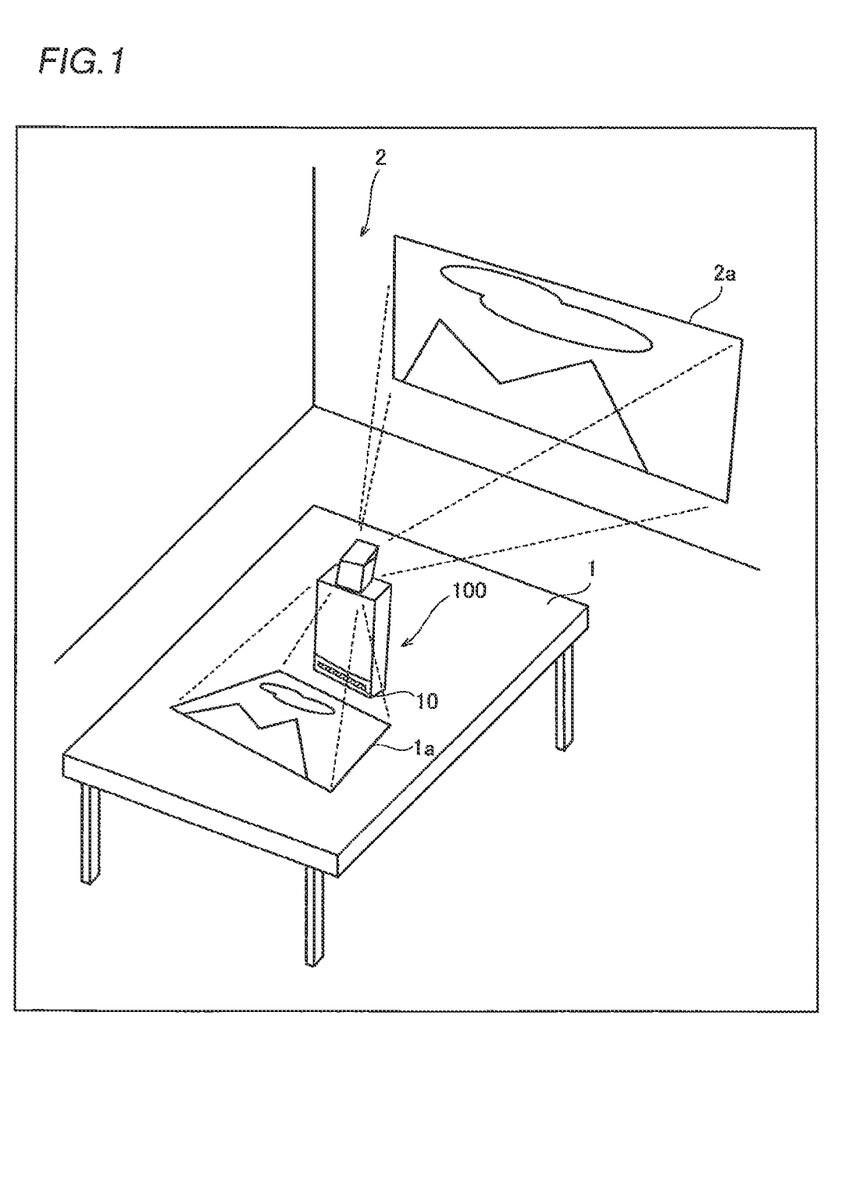
[FIG. 1] A schematic diagram showing a use state of a projector according to a first embodiment of the present invention.

The projector 100 according to the first embodiment of the present invention is formed to be used by being arranged on a table 1, as shown in FIG. 1. Further, the projector 100 is so formed that an image 2a for presentation (for display) is projected (2D-displayed (plane-displayed)) toward a projection area such as a screen 2 or the like. The table 1 and the screen 2 are examples of the "projection area" in the present invention. The projector 100 is so formed that another image 1a similar to the image 2a for presentation is projected (2D-displayed (plane-displayed)) onto the upper surface of another projection area such as the table 1 or the like. The image 1a is so projected that the magnitude of the image 1a projected onto the table 1 is smaller than the magnitude of the image 2a projected onto the screen 2. A sensor 10 such as a CCD sensor is provided on a side surface of the projector 100 closer to the side where the image 1a is projected. The sensor 10 is an example of the "sensing portion" in the present invention.

Figure 2:
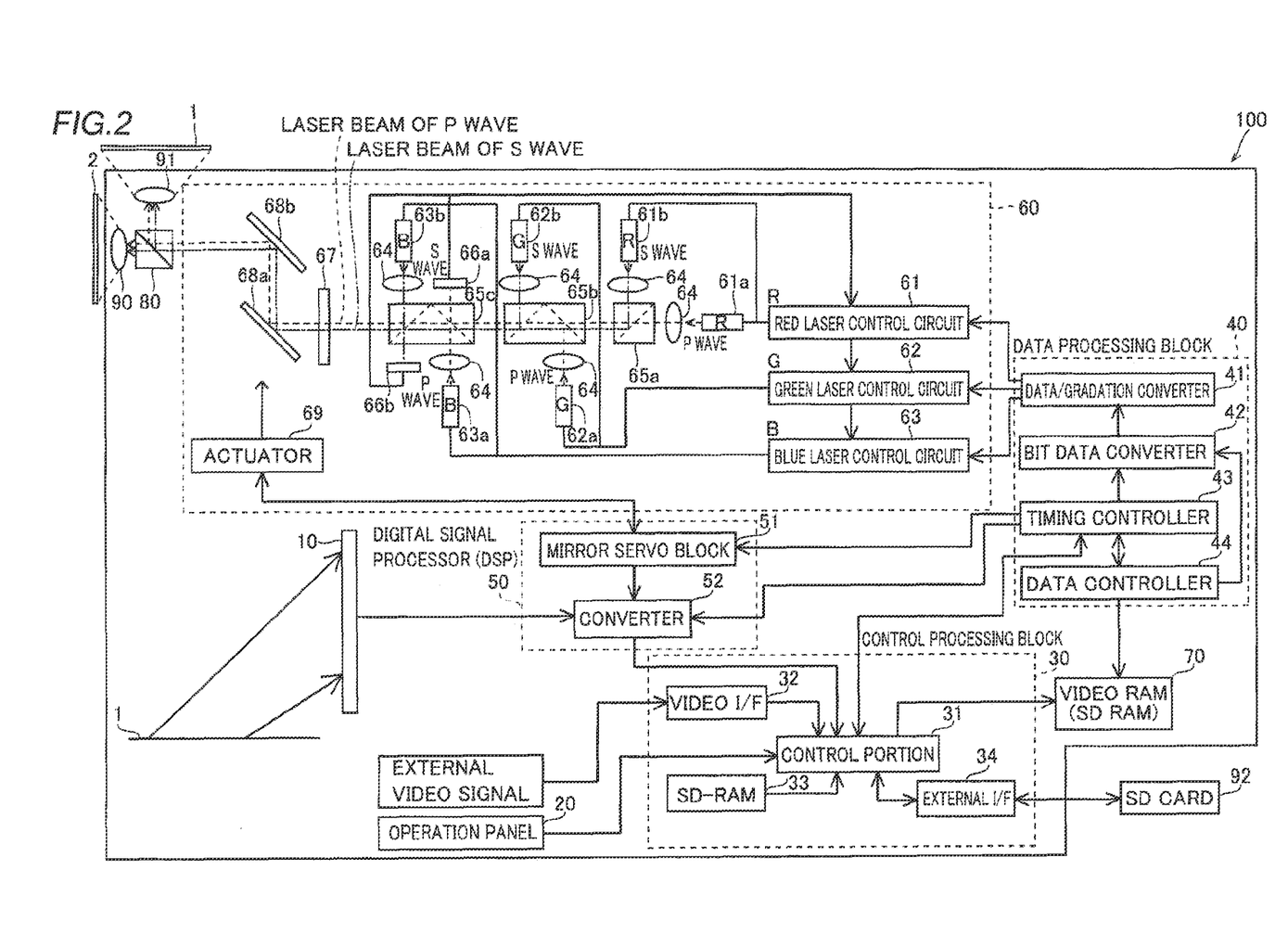
[FIG. 2] A block diagram showing the structure of the projector according to the first embodiment of the present invention.

As shown in FIG. 2, the projector 100 includes an operation panel 20, a control processing block 30, a data processing block 40, a digital signal processor (DSP) 50, a laser beam source 60, a Video RAM (SD RAM) 700, a beam splitter 80 and two magnifying lenses 90 and 91. The beam splitter 80 is an example of the "splitter member" in the present invention.

The control processing block 30 includes a control portion 31 managing control of the overall projector 100, a Video I/F 32 which is an interface (I/F) for receiving an external video signal, an SD-RAM 33 and an external I/F 34.

The data processing block 40 includes a data/gradation converter 41, a bit data converter 42, a timing controller 43 and a data controller 44.

The digital signal processor 50 includes a mirror servo block 51 and a converter 52.

The laser beam source 60 includes a red laser control circuit 61, a green laser control circuit 62, a blue laser control circuit 63, a first red LD 61a and a second red LD 61b emitting red laser beams, a first green LD 62a and a second green LD 62b emitting green laser beams, and a first blue LD 63a and a second blue LD 63b emitting blue laser beams. Further, the laser beam source 60 includes six collimator lenses 64, three polarizing beam splitters 65a, 65b and 65c, two light detectors 66a and 66b, a spatial modulator 67 including a Faraday device, a liquid crystal device and the like, an MEMS mirror 68a for horizontally scanning laser beams, another MEMS mirror 68b for vertically scanning laser beams and an actuator 69 for horizontally and vertically driving the MEMS mirror 68a and the MEMS mirror 68b. The first red LD 61a, the first green LD 62a and the first blue LD 63a are examples of the "first red laser beam generation portion", the "first green laser beam generation portion" and the "first blue laser beam generation portion" in the present invention respectively. The second red LD 61b, the second green LD 62b and the second blue LD 63b are examples of the "second red laser beam generation portion", the "second green laser beam generation portion" and the "second blue laser beam generation portion" in the present invention respectively. The MEMS mirrors 68a and 68b are examples of the "projection portion" in the present invention. The polarizing beam splitters 65a, 65b and 65c are examples of the "optical members" in the present invention.

The operation panel 20 is provided on a surface or a side surface of a housing of the projector 100. The operation panel 20 includes a display (not shown) for displaying operation contents, switches accepting operation input with respect to the projector 100 and the like, for example. The operation panel 20 is formed, when accepting an operation from the user, to transmit a signal responsive to the operation content to the control portion 31 of the control processing block 30. Further, the operation panel 20 is so formed, when the user operates (touches) the content of the image 1a, that the operation of the user is sensed by the sensor 10 provided on the projector and a signal based on the operation content is transmitted to the control portion 31 of the control processing block 30. Thus, it is possible to use the image 1a projected onto the table 1 as an operation screen.

The external video signal supplied from outside the projector 100 is formed to be input in the Video I/F 32. The external I/F 34 is so formed that a memory such as an SD card 92, for example, is mountable. The control portion 31 is formed to read data from the SD card 92, so that the read data is stored in the Video RAM 70.

Further, the control portion 31 is formed to control display of a picture based on image data temporarily held in the Video RAM 70 by mutually communicating with the timing controller 43 of the data processing block 40.

In the data processing block 40, the timing controller 43 is formed to read data held in the Video RAM 70 through the data controller 44 on the basis of a signal output from the control portion 31. The data controller 44 is formed to transmit the read data to the bit data converter 42. The bit data converter 42 is formed to transmit the data to the data/gradation converter 41 on the basis of a signal from the timing controller 43. The bit data converter 42 has a function of converting externally supplied image data to data suitable to a form projectable by laser beams.

The data/gradation converter 41 is formed to convert data output from the bit data converter 42 to gradations of three colors of red (R: Red), green (G: Green) and blue (B: Blue) and to transmit the data after the conversion to the red laser control circuit 61, the green laser control circuit 62 and the blue laser circuit 63 respectively.

The red laser control circuit 61 is formed to transmit the data from the data/gradation converter 41 to the first red LD 61a and the second red LD 61b. The green laser control circuit 62 is formed to transmit the data from the data/gradation converter 41 to the first green LD 62a and the second green LD 62b. The blue laser control circuit 63 is formed to transmit the data from the data/gradation converter 41 to the first blue LD 63a and the second blue LD 63b.

The first red LD 61a, the first green LD 62a and the first blue LED 63a are formed to be capable of emitting laser beams of P waves respectively. The laser beams of the P waves emitted by the first red LD 61a, the first green LD 62a and the first blue LED 63a are examples of the "first laser beam having a first polarization direction" in the present invention. The second red LD 61b, the second green LD 62b and the second blue LD 63b are formed to be capable of emitting laser beams of S waves respectively. The laser beams of the S waves emitted by the second red LD 61b, the second green LD 62b and the second blue LD 63b are examples of the "second laser beam having a second polarization direction" in the present invention.

Figure 3:
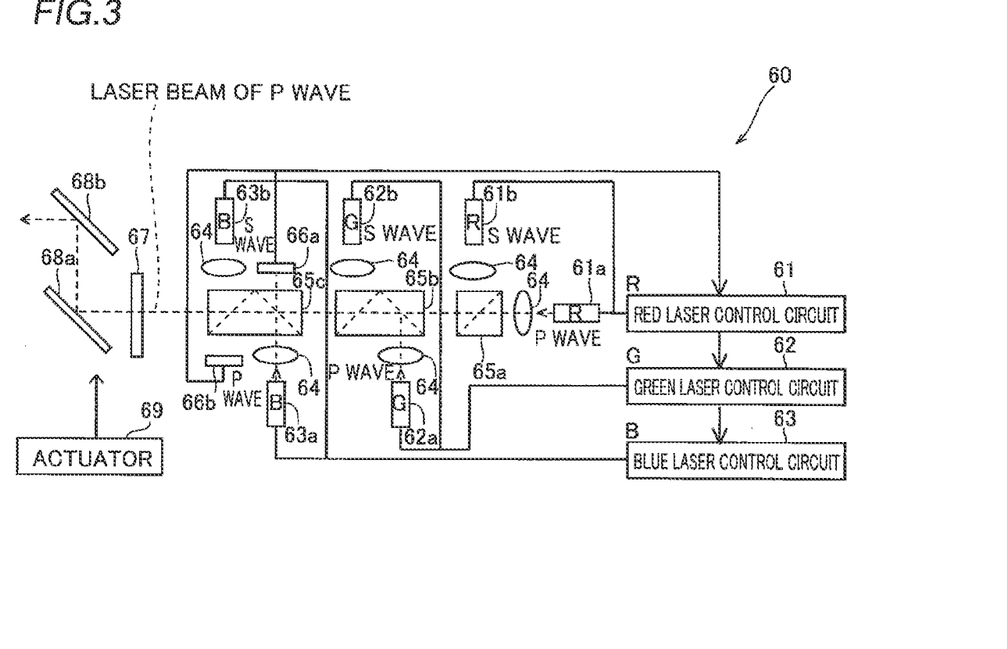
[FIG. 3] A diagram showing a state where laser beams of P waves are emitted from a first red LD, a first green LD and a first blue LD of the projector according to the first embodiment of the present invention.

As shown in FIG. 3, the projector 100 is so formed that the red laser beam of the P wave emitted from the first red LD 61a, the green laser beam of the P wave emitted from the first green LD 62a and the blue laser beam of the P wave emitted from the first blue LD 63a are adjusted to parallel beams by the collimator lenses 64 and introduced into the MEMS mirror 68a through the polarizing beam splitters 65a, 65b and 65c respectively. Further, the projector 100 is so formed that the optical axes of the red, green and blue laser beams of the P waves introduced into the MEMS mirror 68a overlap on the same axis. The light detector 66a is formed to be capable of detecting the gradations of the laser beams emitted from the first red LD 61a, the first green LD 62a and the first blue LD 63a. The projector 100 is so formed that signals based on the detected gradations of the laser beams are transmitted to the red laser control circuit 61.

Figure 4:
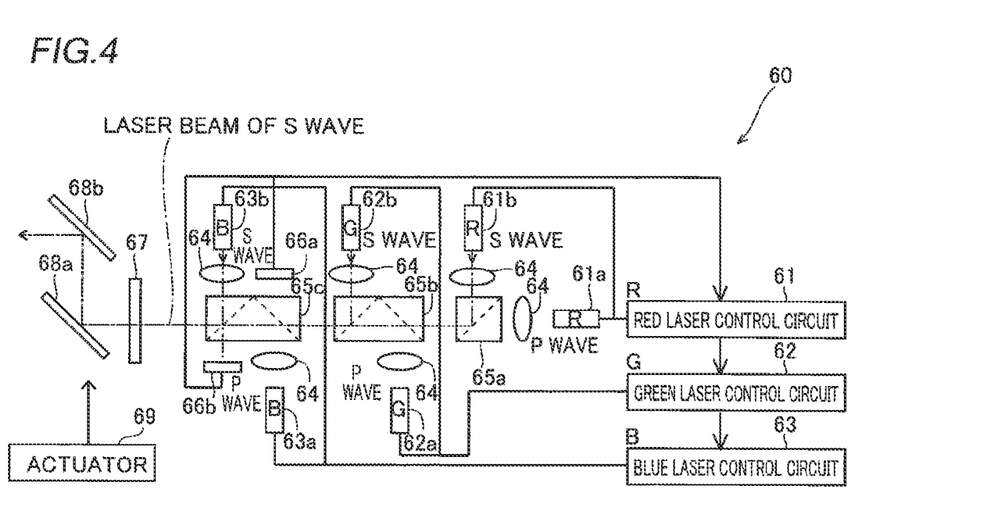
[FIG. 4] A diagram showing a state where laser beams of S waves are emitted from a second red LD, a second green LD and a second blue LD of the projector according to the first embodiment of the present invention.

As shown in FIG. 4, the projector 100 is so formed that the red laser beam of the S wave emitted from the second red LD 61b, the green laser beam of the S wave emitted from the second green LD 62b and the blue laser beam of the S wave emitted from the second blue LD 63b are adjusted to parallel beams by the collimator lenses 64 and introduced into the MEMS mirror 68a through the polarizing beam splitters 65a, 65b and 65c respectively. Further, the projector 100 is so formed that the optical axes of the red, green and blue laser beams of the S waves introduced into the MEMS mirror 68a overlap on the same axis. The light detector 66b is formed to be capable of detecting the gradations of the laser beams emitted from the second red LD 61b, the second green LD 62b and the second blue LD 63b. The projector 100 is so formed that signals based on the detected gradations of the laser beams are transmitted to the red laser control circuit 61.

According to the first embodiment, the projector 100 is so formed that the optical axes of the laser beams of the P waves emitted from the first red LD 61a, the first green LD 62a and the first blue LD 63a respectively to overlap on the same axis and the optical axes of the laser beams of the S waves emitted from the second red LD 61b, the second green LD 62b and the second blue LD 63b respectively to overlap on the same axis parallelly deviate from each other, as shown in FIG. 2. Further, the projector 100 is so formed that the laser beams are applied through substantially identical paths in a state where the optical axes deviate from each other after the laser beams are synthesized with each other so that the optical axes of the laser beams of the P waves emitted from the first red LD 61a, the first green LD 62a and the first blue LD 63a respectively to overlap on the same axis and the optical axes of the laser beams of the S waves emitted from the second red LD 61b, the second green LD 62b and the second blue LD 63b respectively to overlap on the same axis do not concentrate on single points of the MEMS mirrors 68a and 68b.

In a case where the optical axes of the laser beams of the P waves and the optical axes of the laser beams of the S waves so deviate from each other that the laser beams of the P waves and the laser beams of the S waves emit laser beams with respect to the same image, the images projected onto the table 1 and the screen 2 deviate from each other. According to the first embodiment, therefore, the control portion 31 is formed to deviate timings for emitting the laser beams of the P waves from each other in response to the quantities of deviation between the optical axes of the laser beams of the P waves and the optical axes of the laser beams of the S waves so that the image projected by the laser beams of the P waves and the image projected by the laser beams of the S waves substantially coincide with each other when the images are projected by scanning the laser beams of the P waves and the laser beams of the S waves.

Figure 5:
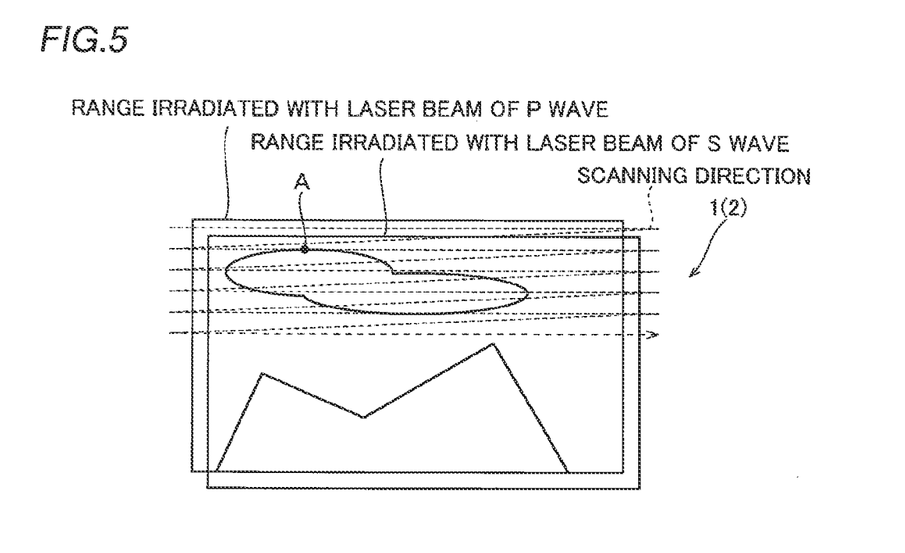
[FIG. 5] A diagram showing an image formed by applying (projecting) the laser beams of the P waves and the laser beams of the S waves in the projector according to the first embodiment of the present invention.

More specifically, the projector 100 is so formed that scanning of the laser beams is performed successively from upper left portions toward lower right portions of the projection areas such as the table 1 and the screen 2, as shown in FIG. 5. If the control portion 31 irradiates a certain image (image corresponding to a point A, for example) with the laser beams of the P waves and the laser beams of the S waves at the same timing, images corresponding to the point A are projected in a deviating state on the table 1 and the screen 2. Therefore, the control portion 31 controls the timings for irradiating the image corresponding to the point A to differ between the laser beams of the P waves and the laser beams of the S waves. Thus, positions of the table 1 and the screen 2 onto which the image corresponding to the point A irradiated with the P waves and positions of the table 1 and the screen 2 onto which the image corresponding to the point A irradiated with the S waves substantially coincide with each other.

Further, the projector 100 is so formed that the laser beams of the P waves emitted from the first red LD 61a, the first green LD 62a and the first blue LD 63a and the laser beams of the S waves emitted from the second red LD 61b, the second green LD 62b and the second blue LD 63b are applied to the spatial modulator 67 after being synthesized with each other. The laser beams of the P waves emitted from the first red LD 61a, the first green LD 62a and the first blue LD 63a and the laser beams of the S waves emitted from the second red LD 61*b*, the second green LD 62*b* and the second blue LD 63*b* are so synthesized with each other that speckle noises resulting from the laser beams of the P waves and the laser beams of the S waves can be averaged, whereby the number of speckle noises projected onto the table 1 and the screen 2 can be reduced.

The spatial modulator 67 is formed to be switchable to an ON-state or an OFF-state every frame. This spatial modulator 67 is formed to be alternately switched to the ON-state and to the OFF-state thereby alternately repeating an operation of rotating both of the polarization direction of the laser beams of the P waves and the polarization direction of the laser beams of the S waves by 90 degrees clockwise, for example, and an operation of transmitting the laser beams therethrough as such without rotating both of the polarization direction of the laser beams of the P waves and the polarization direction of the laser beams of the S waves.

More specifically, the spatial modulator 67 is so formed that the laser beams of the P waves are rotated by 90 degrees in a first direction (clockwise direction, for example) to be modulated to laser beams of S waves and the laser beams of the S waves are rotated by 90 degrees in the clockwise direction, for example, to be modulated to laser beams of P waves in a case where the spatial modulator 67 is in the ON-state.

Further, the spatial modulator 67 is so formed that the laser beams of the P waves and the laser beams of the S waves are not modulated (rotated) but transmitted through the spatial modulator 67 in a case where the spatial modulator 67 is switched from the ON-state to the OFF-state.

The MEMS mirror 68*a* and the MEMS mirror 68*b* include small-sized vibrating mirror elements driven by the actuator 69 and capable of vibrating at prescribed deflection angles. The actuator 69 is so formed that positions and inclinations of the MEMS mirror 68*a* and the MEMS mirror 68*b* are changed on the basis of a signal from the mirror servo block 51. The projector 100 is so formed that the laser beams of the P waves and the laser beams of the S waves reflected by the MEMS mirror 68*b* pass through a collimator lens (not shown) to become parallel beams, are modulated by a spatial light modulator (not shown) and applied to the beam splitter 80.

Further, the projector 100 is so formed that laser beams of P waves and laser beams of S waves reflected (refracted) by the beam splitter 80 are projected onto the table 1 among the laser beams of the P waves and the laser beams of the S waves applied to the beam splitter 80 and laser beams of P waves and laser beams of S waves passing through (are transmitted through) the beam splitter 80 are projected onto the screen 2 among the laser beams of the P waves and the laser beams of the S waves applied to the beam splitter 80.

According to the first embodiment, as hereinabove described, the projector 100 is formed to deviate the optical axes of the laser beams emitted from the first red LD 61*a*, the first green LD 62*a*, the first blue LD 63*a*, the second red LD 61*b*, the second green LD 62*b* and the second blue LD 63*b* respectively from each other so that the laser beams emitted from the first red LD 61*a*, the first green LD 62*a*, the first blue LD 63*a*, the second red LD 61*b*, the second green LD 62*b* and the second blue LD 63*b* respectively do not concentrate on single points of the MEMS mirrors 68*a* and 68*b* so that the laser beams are applied to the MEMS mirrors 68*a* and 68*b* in a dispersed state, whereby portions of the MEMS mirrors 68*a* and 68*b* irradiated with the laser beams can be inhibited from deterioration while improving brightness, dissimilarly to a case where the laser beams are applied to the same points of the MEMS mirrors 68*a* and 68*b*. Further, energy of the laser beams can be inhibited from concentrating on the MEMS mirrors 68*a* and 68*b*, whereby deterioration of the MEMS mirrors 68*a* and 68*b* resulting from heat of the energy can be suppressed.

According to the first embodiment, as hereinabove described, the control portion 31 is formed to deviate the timings when the first red LD 61*a*, the first green LD 62*a*, the first blue LD 63*a*, the second red LD 61*b*, the second green LD 62*b* and the second blue LD 63*b* emit the laser beams from each other by prescribed times in response to the quantities of deviation between the optical axes of the laser beams emitted from the first red LD 61*a*, the first green LD 62*a*, the first blue LD 63*a*, the second red LD 61*b*, the second green LD 62*b* and the second blue LD 63*b* respectively so that the images projected onto the screen 2 and the table 1 substantially coincide with each other when the images are projected by scanning the laser beams emitted from the first red LD 61*a*, the first green LD 62*a*, the first blue LD 63*a*, the second red LD 61*b*, the second green LD 62*b* and the second blue LD 63*b* whose optical axes have been deviated from each other respectively, whereby deviation between the images projected onto the screen 2 and the table 1 resulting from the quantities of deviation between the optical axes of the laser beams emitted from the first red LD 61*a*, the first green LD 62*a*, the first blue LD 63*a*, the second red LD 61*b*, the second green LD 62*b* and the second blue LD 63*b* respectively can be easily suppressed.

According to the first embodiment, as hereinabove described, the projector 100 is formed to synthesize the laser beams with each other while deviating the optical axes of the laser beams of the P waves and the laser beams of the S waves from each other so that the laser beams of the P waves and the laser beams of the S waves do not concentrate on single points of the EMS mirrors 68*a* and 68*b* so that the laser beams of the P waves and the laser beams of the S waves are applied to the MEMS mirrors 68*a* and 68*b* in the dispersed state, whereby the portions of the MEMS mirror 68*a* (68*b*) irradiated with the laser beams of the P waves and the laser beams of the S waves can be inhibited from deterioration, dissimilarly to a case where the laser beams of the P waves and the laser beams of the S waves are applied to the same points of the MEMS mirrors 68*a* and 68*b*.

According to the first embodiment, as hereinabove described, the projector 100 is formed to synthesize the laser beams with ach other while deviating the optical axes of the laser beams emitted from the first red LD 61*a*, the first green LD 62*a* and the first blue LD 63*a* and the laser beams emitted from the second red LD 61*b*, the second green LD 62*b* and the second blue LD 63*b* from each other, so that the laser beams emitted from the first red LD 61*a*, the first green LD 62*a* and the first blue LD 63*a* and the laser beams emitted from the second red LD 61*b*, the second green LD 62*b* and the second blue LD 63*b* do not concentrate on single points not only with respect to the MEMS mirror 68*a* (68*b*) but also with respect to the polarizing beam splitters 65*a*, 65*b* and 65*c*. Thus, the laser beams emitted from the first red LD 61*a*, the first green LD 62*a* and the first blue LD 63*a* and the laser beams emitted from the second red LD 61*b*, the second green LD 62*b* and the second blue LD 63*b* are applied not only to the MEMS mirror 68*a* (68*b*) but also to the polarizing beam splitters 65*a*, 65*b* and 65*c* in the dispersed state, whereby portions irradiated with the laser beams emitted from the first red LD 61*a*, the first green LD 62*a* and the first blue LD 63*a* and the laser beams emitted from the second red LD 61*b*, the second green LD 62*b* and the second blue LD 63*b* can be inhibited from deterioration not only with respect to the MEMS mirror 68*a* (68*b*) but also with respect to the polarizing beam splitters 65*a*, 65*b* and 65*c*.

According to the first embodiment, as hereinabove described, the projector 100 is so formed that the laser beams emitted from the first red LD 61*a*, the first green LD 62*a* and the first blue LD 63*a* and the laser beams emitted from the second red LD 61*b*, the second green LD 62*b* and the second blue LD 63*b* are applied through substantially identical paths in the state where the optical axes deviate from each other after the laser beams are synthesized with each other, not to concentrate on one point of the MEMS mirror 68*a* (68*b*). Thus, the structure of the projector 100 can be simplified dissimilarly to a case where paths through which the laser beams emitted from the first red LD 61*a*, the first green LD 62*a* and the first blue LD 63*a* and the laser beams emitted from the second red LD 61*b*, the second green LD 62*b* and the second blue LD 63*b* are applied are separately provided.

According to the first embodiment, as hereinabove described, the laser beams emitted from the first red LD 61*a*, the first green LD 62*a* and the first blue LD 63*a* and the laser beams emitted from the second red LD 61*b*, the second green LD 62*b* and the second blue LD 63*b* are so applied as not to concentrate on one point of the MEMS mirror 68*a* (68*b*) in a state where the optical axes substantially parallelly deviate from each other, whereby the optical axes of the laser beams emitted from the first red LD 61*a*, the first green LD 62*a* and the first blue LD 63*a* and the optical axes of the laser beams emitted from the second red LD 61*b*, the second green LD 62*b* and the second blue LD 63*b* can be easily inhibited from concentrating on one point of the MEMS mirror 68*a* (68*b*).

According to the first embodiment, as hereinabove described, the optical axes of the laser beams emitted from the first red LD 61*a*, the first green LD 62*a* and the first blue LD 63*a* respectively to overlap on the same axis and the optical axes of the laser beams emitted from the second red LD 61*b*, the second green LD 62*b* and the second blue LD 63*b* respectively to overlap on the same axis are so deviated from each other that the red (R), green (G) and blue (B) laser beams of the P waves emitted from the first red LD 61*a*, the first green LD 62*a* and the first blue LD 63*a* respectively and the red (R), green (G) and blue (B) laser beams of the S waves emitted from the second red LD 61*b*, the second green LD 62*b* and the second blue LD 63*b* respectively are applied to the MEMS mirrors 68*a* and 68*b* in the dispersed state, whereby the portions of the MEMS mirror 68*a* (68*b*) irradiated with the laser beams of the P waves and the laser beams of the S waves can be inhibited from deterioration in a case of color-displaying the images in red (R), green (G) and blue (B).

According to the first embodiment, as hereinabove described, the spatial modulator 67 including the liquid crystal device rotates the polarization direction of the laser beams of the P waves and the polarization direction of the laser beams of the S waves by 90 degrees, whereby the laser beams of the P waves and the laser beams of the S waves can be applied to the MEMS mirror 68*a* (68*b*) in the state where both the polarization direction of the laser beams of the P waves and the polarization direction of the laser beams of the S waves are rotated by 90 degrees.

According to the first embodiment, as hereinabove described, the spatial modulator 67 including the liquid crystal device alternately repeats the operation of rotating both of the polarization direction of the laser beams of the P waves and the polarization direction of the laser beams of the S waves by 90 degrees clockwise and the operation of transmitting the laser beams therethrough as such without rotating both of the polarization direction of the laser beams of the P waves and the polarization direction of the laser beams of the S waves so that brightness difference per frame resulting from difference between transmittance values of the laser beams of the P waves and the laser beams of the S waves can be averaged, whereby occurrence of flickers (blinks) in the projected images can be suppressed.

According to the first embodiment, as hereinabove described, the projector 100 is formed to synthesize the laser beams of the S waves and the laser beams of the P waves with each other while deviating the optical axes of the laser beams of the S waves and the laser beams of the P waves from each other so that the laser beams of the S waves and the laser beams of the P waves do not concentrate on single points of the projection portions so that the laser beams emitted from the first red LD 61*a*, the first green LD 62*a* and the first blue LD 63*a* including the laser beams of the P waves and the laser beams emitted from the second red LD 61*b*, the second green LD 62*b* and the second blue LD 63*b* including the laser beams of the S waves are applied to the MEMS mirror 68*a* (68*b*) in the dispersed state, whereby the portions of the MEMS mirror 68*a* (68*b*) irradiated with the laser beams of the P waves and the laser beams of the S waves can be inhibited from deterioration.

According to the first embodiment, as hereinabove described, the sensor 10 sensing that the image la projected by the MEMS mirror 68*a* (68*b*) in the state where the optical axes of the laser beams emitted from the first red LD 61*a*, the first green LD 62*a*, the first blue LD 63*a*, the second red LD 61*b*, the second green LD 62*b* and the second blue LD 63*b* respectively deviate from each other has been operated by the user is so provided that it is possible to easily sense that the image la has been operated by the user.

According to the first embodiment, as hereinabove described, the beam splitter 80 projecting the image 1*a* (2*a*) projected by the MEMS mirror 68*a* (68*b*) in the state where the optical axes of the laser beams emitted from the first red LD 61*a*, the first green LD 62*a*, the first blue LD 63*a*, the second red LD 61*b*, the second green LD 62*b* and the second blue LD 63*b* respectively deviate from each other on the table 1 and the screen 2 is so provided that the user can use the image la projected onto the table 1 for operation, while he/she can use the image 2*a* projected onto the screen 2 for presentation (for display).

(Second Embodiment)

Figure 6:
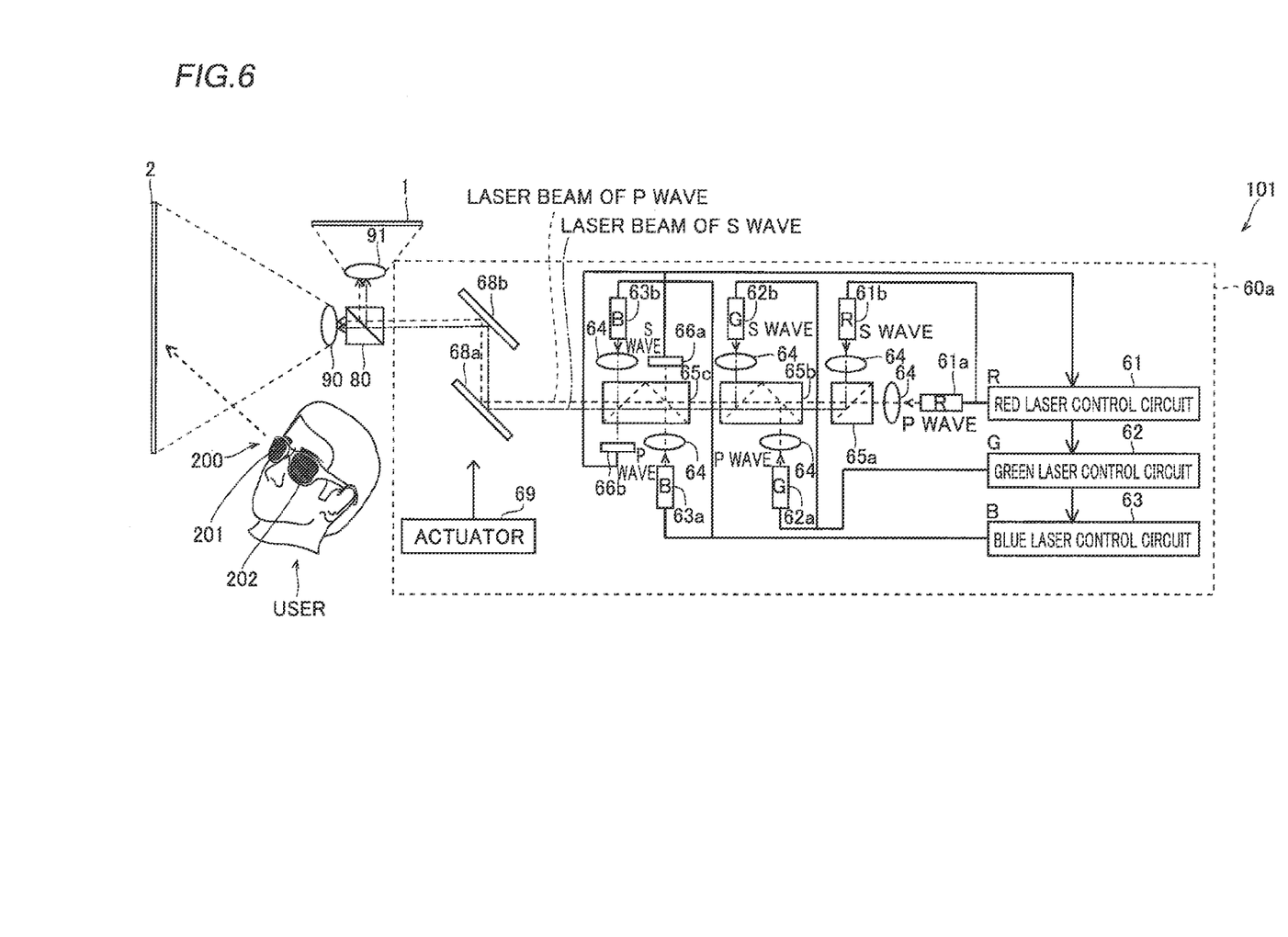
[FIG. 6] A block diagram showing the structure of a projector according to a second embodiment of the present invention.

A second embodiment is now described with reference to FIG. 6. In a projector 101 according to this second embodiment, an example of performing 3-D display (stereoscopic display) without rotating laser beams of P waves and laser beams of S waves by 90 degrees by not providing a spatial modulator 67 is described, dissimilarly to the aforementioned first embodiment having performed the 2-D display (plane display) by providing the spatial modulator for rotating the polarization directions of the laser beams of the P waves and the laser beams of the S waves.

A laser beam source 60*a* of the projector 101 according to the second embodiment of the present invention is so formed that laser beams of P waves emitted from a first red LD 61*a*, a first green LD 62*a* an a first blue LD 63*a* and laser beams of S waves emitted from a second red LD 61*b*, a second green LD 62*b* and a second blue LD 63*b* are projected onto a screen 2 and a table 1 through an MEMS mirror 68*a*, another MEMS mirror 68*b*, a beam splitter 80 and magnifying lenses 90 and 91 while polarization directions are not rotated by 90 degrees.

The MEMS mirror 68*a* and the MEMS mirror 68*b* are formed to be capable of projecting stereoscopic images on the screen 2 and the table 1 by scanning the laser beams of the P waves and the laser beams of the S waves.

More specifically, the projector 101 is formed to project a stereoscopic image for a right eye by scanning the laser beams of the P waves, and to project a stereoscopic image for a left eye by scanning the laser beams of the S waves. Further, the projector 101 is so formed that the laser beams of the P waves projecting the stereoscopic image for the right eye and the laser beams of the S waves projecting the stereoscopic image for the left eye are simultaneously applied in a state where optical axes deviate from each other thereby projecting the stereoscopic images.

The projector 101 is so formed that the stereoscopic images projected onto the screen 2 and the table 1 are appreciable by employing polarized glasses 200. These polarized glasses 200 are provided on a right-eye portion with a polarizing plate 201 allowing appreciation of the image projected by the laser beams of the P waves, and provided on a left-eye portion with a polarizing plate 202 allowing appreciation of the image projected by the laser beams of the S waves.

According to the second embodiment, as hereinabove described, the MEMS mirrors 68a and 68b project the stereoscopic image for the right eye by scanning either the laser beams of the P waves or the laser beams of the S waves and project the stereoscopic image for the left eye by scanning either the laser beams of the S waves or the laser beams of the P waves so that the stereoscopic image for the right eye and the stereoscopic image for the left eye can be simultaneously projected in one frame, whereby a frame rate may not be raised, dissimilarly to a case of alternately projecting the stereoscopic image for the right eye and the stereoscopic image for the left eye every frame, for example.

According to the second embodiment, as hereinabove described, the projector 101 is formed to project the stereoscopic images in the state where the optical axes of the laser beams projecting the stereoscopic image for the right eye and the laser beams projecting the stereoscopic image for the left deviate from each other, whereby the same can project the stereoscopic images while inhibiting the laser beams projecting the stereoscopic image for the right eye and the laser beams projecting the stereoscopic image for the left eye from being concentrically applied to the same point of the MEMS mirror 68a (68b).

According to the second embodiment, as hereinabove described, the projector 101 is formed to project the stereoscopic images by simultaneously applying the laser beams projecting the stereoscopic image for the right eye and the laser beams projecting the stereoscopic image for the left eye in the state where the optical axes deviate from each other, whereby the same can project the stereoscopic images without raising the frame rate, dissimilarly to the case of alternately projecting the stereoscopic image for the right eye and the stereoscopic image for the right eye every frame.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the example of using the projector by arranging the same on the table has been shown as an example of the projector according to the present invention in each of the aforementioned first and second embodiments, the present invention is not restricted to this. According to the present invention, the projector may be arranged on a member other than the table to be used.

While the MEMS mirrors have been shown as examples of the projection area in the present invention in each of the aforementioned first and second embodiments, the present invention is not restricted to this. For example, members other than the MEMS mirrors are also applicable, so far as the same can project laser beams on a screen or the like.

While the example of providing the two laser beam generation portions, i.e., the first laser beam generation portion including the first red LD, the first green LD and the first blue LD and the second laser beam generation portion including the second red LD, the second green LD and the second blue LD has been shown in each of the aforementioned first and second embodiments, the present invention is not restricted to this. According to the present invention, at least three laser beam generation portions may be provided. In this case, the projector may be so formed that optical axes of laser beams emitted from at least three laser beam generation portions deviate from each other.

While the laser beam generation portions emitting the red, green and blue laser beams have been shown in each of the aforementioned first and second embodiments, the present invention is not restricted to this. For example, laser beam generation portions of colors other than red, green and blue may be provided, or laser beam generation portions of a number other than three of red, green and blue may be provided.

While the example of rotating the polarization directions of the laser beams of the P waves and the laser beams of the S waves by 90 degrees with the spatial modulator has been shown in the aforementioned first embodiment, the present invention is not restricted to this. For example, the polarization directions of the laser beams of the P waves and the laser beams of the S waves may be rotated at an angle other than 90 degrees.

While the screen and the table have been shown as examples of the projection area onto which the image is projected in each of the aforementioned first and second embodiments, the present invention is not restricted to this. According to the present invention, projection areas may be members other than the screen and the table, so far as images can be projected onto the same.

The invention claimed is:

1. A projector comprising:
 a plurality of laser beam generation portions emitting laser beams having substantially identical lasing wavelengths;
 a projection portion projecting an image onto an arbitrary projection area by scanning the laser beams emitted from the plurality of laser beam generation portions respectively; and
 a control portion controlling generation timings of the laser beams emitted from the plurality of laser beam generation portions respectively;
 wherein the projector that deviates optical axes of the laser beams emitted from the plurality of laser beam generation portions respectively to be irradiated with the laser beams emitted from the plurality of laser beam generation portions respectively on different positions of the projection portion, and
 the control portion that deviates the timings when the plurality of laser beam generation portions emit the laser beams from each other in response to the quantities of deviation of the optical axes of the laser beams emitted from the plurality of laser beam generation portions respectively to substantially coincide the image projected onto the arbitrary projection area with each other when the image is projected by scanning the laser beams emitted from the plurality of laser beam generation portions whose optical axes have been deviated from each other.

2. The projector according to claim 1, wherein the control portion is formed to deviate the timings when the plurality of laser generation portions emit the laser beams from each other in response to the quantities of deviation of the optical axes of the laser beams emitted from the plurality of laser beam generation portions respectively so that the image projected onto the arbitrary projection area substantially coincides.

3. The projector according to claim 1, wherein
the plurality of laser beam generation portions emitting the laser beams having substantially identical lasing wavelengths include a first laser beam generation portion for emitting a first laser beam and a second laser beam generation portion for emitting a second laser beam, and
the projector is formed to synthesize the first laser beam and the second laser beam with each other while deviating the optical axes of the first laser beam and the second laser beam from each other so that the first laser beam and the second laser beam do not concentrate on one point of the projection portion.

4. The projector according to claim 3, wherein
the first laser beam generation portion is formed to emit the first laser beam having a first polarization direction,
the second laser beam generation portion is formed to emit the second laser beam having a second polarization direction orthogonal to the first polarization direction, and
the projector is formed to synthesize the first laser beam and the second laser beam with each other while deviating the optical axes of the first laser beam having the first polarization direction and the second laser beam having the second polarization direction from each other so that the first laser beam and the second laser beam do not concentrate on one point of the projection portion.

5. The projector according to claim 3, further comprising a plurality of optical members reflecting the first laser beam emitted from the first laser beam generation portion and the second laser beam emitted from the second laser beam generation portion or transmitting the first and second laser beams therethrough, and
formed to synthesize the first laser beam and the second laser beam with each other while deviating the optical axes of the first laser beam and the second laser beam from each other so that the first laser beam and the second laser beam do not concentrate on one point not only with respect to the projection portion but also with respect to the plurality of optical members.

6. The projector according to claim 3, so formed that the first laser beam and the second laser beam are applied through substantially identical paths in a state where the optical axes deviate from each other after being synthesized, not to concentrate on one point of the projection portion.

7. The projector according to claim 3, so formed that the first laser beam and the second laser beam are emitted not to concentrate on one point of the projection portion in a state where the optical axes substantially parallelly deviate from each other.

8. The projector according to claim 3, wherein
the first laser beam generation portion includes a first red laser beam generation portion, a first green laser beam generation portion and a first blue laser beam generation portion,
the second laser beam generation portion includes a second red laser beam generation portion, a second green laser beam generation portion and a second blue laser beam generation portion,
the projector is so formed that optical axes of the first laser beams emitted from the first red laser beam generation portion, the first green laser beam generation portion and the first blue laser beam generation portion respectively overlap on the same axis,
so formed that optical axes of the second laser beams emitted from the second red laser beam generation portion, the second green laser beam generation portion and the second blue laser beam generation portion respectively overlap on the same axis, and
formed to deviate the optical axes of the first laser beams emitted from the first red laser beam generation portion, the first green laser beam generation portion and the first blue laser beam generation portion respectively to overlap on the same axis and the optical axes of the second laser beams emitted from the second red laser beam generation portion, the second green laser beam generation portion and the second blue laser beam generation portion respectively to overlap on the same axis from each other.

9. The projector according to claim 4, further comprising a spatial modulator for rotating at least one of the first polarization direction of the first laser beam and the second polarization direction of the second laser beam by a prescribed angle.

10. The projector according to claim 9, wherein
the spatial modulator is formed to rotate at least one of the first polarization direction of the first laser beam and the second polarization direction of the second laser beam by 90 degrees.

11. The projector according to claim 10, wherein
the spatial modulator is formed to alternately repeat an operation of rotating both of the first polarization direction of the first laser beam and the second polarization direction of the second laser beam by 90 degrees and an operation of transmitting the first laser beam and the second laser beam therethrough as such without rotating both of the first polarization direction of the first laser beam and the second polarization direction of the second laser beam.

12. The projector according to claim 11, wherein
the spatial modulator includes a liquid crystal device, and
the liquid crystal device is formed to alternately repeat the operation of rotating both of the first polarization direction of the first laser beam and the second polarization direction of the second laser beam by 90 degrees and the operation of transmitting the first laser beam and the second laser beam therethrough as such without rotating both of the first polarization direction of the first laser beam and the second polarization direction of the second laser beam by being switched to an ON-state and to an OFF-state.

13. The projector according to claim 4, wherein
the first laser beam having the first polarization direction includes one of a laser beam of an S wave and a laser beam of a P wave orthogonal to the laser beam of the S wave,
the second laser beam having the second polarization direction includes the other one of the laser beam of the S wave and the laser beam of the P wave orthogonal to the laser beam of the S wave, and
the projector is formed to synthesize the laser beam of the S wave and the laser beam of the P wave with each other while deviating optical axes of the laser beam of the S wave and the laser beam of the P wave from each other so that the laser beam of the S wave and the laser beam of the P wave do not concentrate on one point of the projection portion.

14. The projector according to claim 4, wherein
the projection portion is formed to be capable of projecting a stereoscopic image onto the arbitrary projection area by scanning the first laser beam and the second laser beam, and
formed to project a stereoscopic image for a right eye by scanning one of the first laser beam and the second laser beam and to project a stereoscopic image for a left eye by scanning the other one of the first laser beam and the second laser beam.

15. The projector according to claim 14, so formed that a laser beam projecting the stereoscopic image for the right eye by scanning one of the first laser beam and the second laser beam and a laser beam projecting the stereoscopic image for the left eye by scanning the other one of the first laser beam and the second laser beam project the stereoscopic images in a state where optical axes deviate from each other.

16. The projector according to claim 15, so formed that the laser beam projecting the stereoscopic image for the right eye and the laser beam projecting the stereoscopic image for the left eye project the stereoscopic images by being simultaneously emitted in the state where the optical axes deviate from each other.

17. The projector according to claim 1, wherein
the projection portion includes a vibrating mirror projecting the image by scanning the arbitrary projection area in a vertical direction and a transverse direction, and
the projector is formed to deviate optical axes of the laser beams emitted from the plurality of laser beam generation portions respectively from each other so that the laser beams emitted from the plurality of laser beam generation portions respectively do not concentrate on one point of the vibrating mirror.

18. The projector according to claim 1, further comprising a sensing portion sensing that a projection screen projected by the projection portion in the state where the optical axes of the laser beams emitted from the plurality of laser beam generation portions respectively deviate from each other has been operated by the user.

19. The projector according to claim 1, further comprising a splitter member projecting a projection screen projected by the projection portion in the state where the optical axes of the laser beams emitted from the plurality of laser beam generation portions respectively deviate from each other on a plurality of projection areas.

* * * * *